United States Patent
Hatanaka et al.

(10) Patent No.: US 9,238,705 B2
(45) Date of Patent: Jan. 19, 2016

(54) COMPOSITION FOR FORMING THERMOSET FILM HAVING PHOTO-ALIGNMENT PROPERTIES

(75) Inventors: Tadashi Hatanaka, Funabashi (JP); Mitsumasa Kondo, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 571 days.

(21) Appl. No.: 13/639,727

(22) PCT Filed: Apr. 5, 2011

(86) PCT No.: PCT/JP2011/058627
§ 371 (c)(1),
(2), (4) Date: Oct. 5, 2012

(87) PCT Pub. No.: WO2011/126019
PCT Pub. Date: Oct. 13, 2011

(65) Prior Publication Data
US 2013/0025502 A1 Jan. 31, 2013

(30) Foreign Application Priority Data
Apr. 8, 2010 (JP) ................................. 2010-089475

(51) Int. Cl.
C09K 19/00 (2006.01)
C08G 18/77 (2006.01)
C08G 18/62 (2006.01)
G02F 1/13363 (2006.01)
G02F 1/1337 (2006.01)
G02B 5/30 (2006.01)

(52) U.S. Cl.
CPC .......... *C08G 18/778* (2013.01); *C08G 18/6216* (2013.01); *G02B 5/3083* (2013.01); *G02F 1/13363* (2013.01); *G02F 1/133711* (2013.01); *G02F 1/133788* (2013.01); *G02F 2202/025* (2013.01); *Y10T 428/1005* (2015.01)

(58) Field of Classification Search
CPC ....... C08L 61/28; C08L 61/32; C08K 5/0025; G02F 1/1337; G02F 1/133711; G02F 1/13378; G02F 1/133788; G02F 2001/133519; Y10T 428/10; Y10T 428/1005; Y10T 428/1036
USPC .............. 428/1.1, 1.2, 1.3, 1.31, 98; 349/123, 349/124, 106; 525/509, 519; 430/321, 430/270.1, 271.1
See application file for complete search history.

(56) References Cited

U.S. PATENT DOCUMENTS

| | | | |
|---|---|---|---|
| 6,461,694 B1 | 10/2002 | Nishikawa et al. | |
| 2005/0053790 A1* | 3/2005 | Kato | 428/421 |
| 2005/0123774 A1 | 6/2005 | Tashiro | |
| 2006/0022167 A1 | 2/2006 | Lub et al. | |
| 2007/0098922 A1 | 5/2007 | Kim et al. | |
| 2012/0082805 A1* | 4/2012 | Hatanaka et al. | 428/1.2 |

FOREIGN PATENT DOCUMENTS

| | | |
|---|---|---|
| JP | A-62-119522 | 5/1987 |
| JP | A-63-61053 | 3/1988 |
| JP | A-8-136933 | 5/1996 |
| JP | A-9-118717 | 5/1997 |
| JP | A-10-62757 | 3/1998 |
| JP | A-2000-103937 | 4/2000 |
| JP | A-2000-119472 | 4/2000 |
| JP | A-2001-166147 | 6/2001 |
| JP | A-2002-80478 | 3/2002 |
| JP | A-2005-37920 | 2/2005 |
| JP | A-2005-531629 | 10/2005 |
| JP | 2007121721 A * | 5/2007 |
| JP | A-2008-164925 | 7/2008 |
| JP | A-2008-175916 | 7/2008 |
| JP | A-2008-527136 | 7/2008 |
| JP | 2008217001 A * | 9/2008 |
| JP | A-2008-276149 | 11/2008 |
| JP | A-2009-36966 | 2/2009 |
| WO | WO 03/087228 A1 | 10/2003 |
| WO | WO 2010150748 A1 * | 12/2010 |

OTHER PUBLICATIONS

Jul. 19, 2011 International Search Report issued in International Application No. PCT/JP2011/058627 (with translation).

* cited by examiner

*Primary Examiner* — Gwendolyn Blackwell
*Assistant Examiner* — Ruiyun Zhang
(74) *Attorney, Agent, or Firm* — Oliff PLC

(57) ABSTRACT

There is provided a material that exhibits high solvent resistance after the formation of a cured film, excellent photo-alignment capability relative to a polymerizable liquid crystal, satisfactory heat resistance, and high transparency and moreover, that can be dissolved in a glycol-based solvent, a ketone-based solvent, or a lactic acid ester-based solvent that is applicable to the production of an overcoating of a color filter, during the formation of the cured film. A composition for forming thermoset film having photo-alignment properties, including: a component (A) that is a compound having a photo-aligning group and a hydroxy group; and a component (B) that is a silicon isocyanate compound. A liquid crystal alignment layer formed from the thermoset film forming composition, and an optical device with a retardation layer obtained by use of the thermoset film forming composition.

4 Claims, 1 Drawing Sheet

(a) Prior Art
(b)
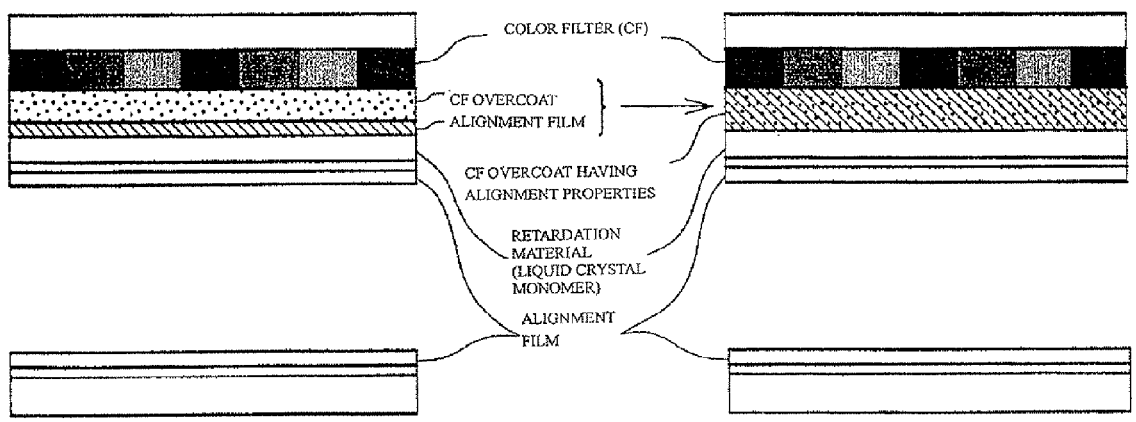

COMPOSITION FOR FORMING THERMOSET FILM HAVING PHOTO-ALIGNMENT PROPERTIES

TECHNICAL FIELD

The present invention relates to a composition for forming thermoset film having photo-alignment properties and a cured film formed from the same. More in detail, the present invention relates to a composition for forming thermoset film having high transparency, liquid crystal alignment capability, high solvent resistance, and heat resistance as a thermoset film formed therefrom, and the application of the composition to the thermoset film. The composition for forming thermoset film having photo-alignment properties of the present invention is particularly suitable for a color filter overcoating agent serving also as a polymerizable liquid crystal alignment function for forming a built-in retardation layer in a liquid crystal display, and a polymerizable liquid crystal alignment material for forming a patterned retardation film for a 3D liquid crystal display.

BACKGROUND ART

Generally, in an optical device such as a liquid crystal display element, an organic EL (electroluminescent) element, and a solid-state image sensor, in order to prevent the element surface from being exposed to a solvent or heat during the production process thereof, a protective film is provided. For the protective film, there are required not only having high adhesion with a substrate to be protected and having high solvent resistance, but also being excellent in performance such as heat resistance.

In addition, in the case where such a protective film is used as a protective film of a color filter used in a color liquid crystal display device or a solid-state image sensor, in order to maintain the transmittance of light transmitting a color filter, it is required that the protective film is a film having high transparency.

In recent years, cost reduction and weight reduction by introducing a retardation material into a cell of a liquid crystal display have been studied and as such a retardation material, there is generally used a material prepared by applying a polymerizable liquid crystal solution to a substrate to align and by photo-curing the resultant coating. For aligning the retardation material, an underlayer film thereof is necessary to be a material having alignment properties after the underlayer film has been subjected to a rubbing process or a polarized UV irradiation. Therefore, the retardation material is formed on a liquid crystal alignment layer film formed on an overcoating of a color filter (see FIG. 1A). If a film serving as both this liquid crystal alignment layer and the overcoating of the color filter (see FIG. 1B) can be formed, great advantages such as the reduction of the cost and the reduction of the number of the processes can be obtained, so that a material capable of serving as both the liquid crystal alignment layer and the overcoating is strongly desired.

Generally, for the overcoating of the color filter, an acrylic resin having high transparency is used. Then, for dissolving the acrylic resin, there are widely used a glycol-based solvent such as propylene glycol monomethyl ether and propylene glycol monomethyl ether acetate; an ester solvent such as ethyl lactate and butyl lactate; and a ketone solvent such as cyclohexanone and methyl amyl ketone from the viewpoint of handling properties and coatability. With respect to the acrylic resin, there is taken a technique for enhancing heat resistance and solvent resistance of the acrylic resin by thermo-curing or photo-curing the acrylic resin (Patent Documents 1 and 2). However, although a conventional thermo-curable or photo-curable acrylic resin has appropriate transparency or solvent resistance, even when an overcoating formed from such an acrylic resin is subjected to a rubbing process or a polarized UV irradiation, satisfactory alignment properties cannot be exhibited.

For the liquid crystal alignment layer, a material containing a solvent-soluble polyimide or polyamic acid is usually used. It is disclosed that such a material is completely imidated by being postbaked, so that solvent resistance becomes imparted to the material and by being subjected to a rubbing process, the material becomes a material exhibiting satisfactory alignment properties (Patent Document 3).

It is disclosed that by irradiating an acrylic resin having in a side chain thereof, a photodimerized moiety such as a cinnamoyl group and a calcone group with polarized UV, satisfactory liquid crystal alignment properties can be exhibited (Patent Document 4).

Furthermore, there is disclosed a polyorganosiloxane in which a photoreactive group is bonded (Patent Document 5).

RELATED-ART DOCUMENTS

Patent Documents

Patent Document 1: Japanese Patent Application Publication No. 2000-103937 (JP 2000-103937 A)
Patent Document 2: Japanese Patent Application Publication No. 2000-119472 (JP 2000-119472 A)
Patent Document 3: Japanese Patent Application Publication No. 2005-037920 (JP 2005-037920 A)
Patent Document 4: Japanese Patent Application Publication No. 9-118717 (JP 9-118717 A)
Patent Document 5: Japanese Patent Application Publication No. 2009-36966 (JP 2009-36966 A)

SUMMARY OF THE INVENTION

Problem to be Solved by the Invention

However, there is a problem in that the liquid crystal alignment layer described in Patent Document 3 has too low transparency for being used as an overcoating material of a color filter. In addition, although polyimide and polyamic acid are soluble in a solvent such as N-methylpyrrolidone and γ-butyrolactone, they have low solubility in a glycol-based solvent, an ester solvent, and a ketone solvent, so that they have difficulty in being applied to an overcoating production line using such a solvent.

In the technology described in Patent Document 4, when the photodimerization rate during the polarized light irradiation is low, intermixing is caused during the application of a polymerizable liquid crystal, which leads to an alignment failure, so that a considerable exposure dosage is necessary.

In the technology described in Patent Document 5, a photoreactive group is bonded to a side chain of a polysiloxane, so that the surface occupancy of the photoreactive group is low and consequently, for developing satisfactory alignment properties, a considerable exposure dosage is necessary.

In the technology of imparting liquid crystal alignment properties by irradiating with light, only by irradiating the liquid crystal alignment layer with polarized UV in an usual exposure dosage (for example, 100 mJ/cm$^2$), the photodimerization reactivity is low and the liquid crystal alignment layer is not satisfactorily crosslinked, so that solvent resistance and heat resistance of the liquid crystal alignment layer is low.

Therefore, when a polymerizable liquid crystal is applied onto the liquid crystal alignment layer for forming a retardation material layer thereon, the liquid crystal alignment layer is dissolved in the polymerizable liquid crystal, so that the retardation material layer cannot exhibit satisfactory alignment properties. When the exposure dosage is enlarged to 1 J/cm$^2$ or more in order to enhance the photodimerization reactivity, alignment properties of the polymerizable liquid crystal are enhanced; however, the exposure time becomes extremely long, and such a method cannot be practical. Furthermore, a material used in a conventional liquid crystal alignment layer is a material having only a photodimerized moiety as a crosslinked moiety, so that the number of crosslinked moieties is small as a whole and the produced liquid crystal alignment layer does not become a layer having satisfactory heat resistance. Therefore, during the production process of a display element performed at 200° C. or more after the formation of the retardation material, it is also feared that the liquid crystal alignment layer is largely contracted.

The present invention has been invented under the circumstances described above and the problem to be solved by the present invention is to provide a material that exhibits high solvent resistance after the formation of a cured film, excellent photo-alignment capability relative to a polymerizable liquid crystal, satisfactory heat resistance, and high transparency and moreover, that can be dissolved in a glycol-based solvent, a ketone-based solvent, or a lactic acid ester-based solvent that is applicable to the production of an overcoating of a color filter, during the formation of the cured film.

Means for Solving the Problem

As a result of assiduous research intended to overcome these disadvantages, the inventors of the present invention have achieved the present invention.

That is, the present invention provides, as a first aspect, a composition for forming thermoset film having photo-alignment properties and containing a component (A) that is a compound having a photo-aligning group and a hydroxy group, and a component (B) that is a silicon isocyanate compound.

As a second aspect, the composition for forming thermoset film having photo-alignment properties according to the first aspect in which the photo-aligning group of the component (A) is a functional group having a structure to be photodimerized or photoisomerized.

As a third aspect, the composition for forming thermoset film having photo-alignment properties according to the first or second aspect in which the photo-aligning group of the component (A) is a cinnamoyl group.

As a fourth aspect, the composition for forming thermoset film having photo-alignment properties according to the first or second aspect in which the photo-aligning group of the component (A) is a group having an azobenzene structure.

As a fifth aspect, the composition for forming thermoset film having photo-alignment properties according to any one of the first to fourth aspects in which the blending ratio between the component (A) and the component (B) is 5:95 to 50:50 in a mass ratio.

As a sixth aspect, a liquid crystal alignment layer formed from the composition for forming thermoset film having photo-alignment properties according to any one of the first to fifth aspects.

As a seventh aspect, an optical device containing a retardation layer obtained using the composition for forming thermoset film having photo-alignment properties according to any one of the first to fifth aspects.

Effects of the Invention

The composition for forming thermoset film having photo-alignment properties of the present invention can form a cured film having, besides high transparency, high solvent resistance, and high heat resistance, liquid crystal alignment capability by light irradiation (photo-alignment properties), so that the composition can be used as a material for forming a photo-aligning liquid crystal alignment film and a photo-aligning overcoating. Particularly, by the composition of the present invention, a "polymerizable liquid crystal alignment layer" providing the characteristics of both of a layer for aligning a polymerizable liquid crystal for forming a retardation material in a cell of a display and an overcoating layer of a color filter can be formed at once, so that a cost reduction by the simplification of the production process and the reduction of the number of processes can be achieved.

Furthermore, the composition for forming thermoset film having photo-alignment properties of the present invention is soluble in a glycol-based solvent, a ketone solvent, and a lactic acid ester solvent, so that the composition can be suitably used in a production line of an overcoating of a color filter using mainly such solvents.

BRIEF DESCRIPTION OF THE DRAWINGS

FIG. 1 is a model diagram showing the contrast of a liquid crystal cell (b) in which a color filter (CF) overcoating having alignment properties is formed using the composition for forming thermoset film having photo-alignment properties of the present invention with a liquid crystal cell (a) in which a liquid crystal alignment film is formed by a conventional technology.

MODES FOR CARRYING OUT THE INVENTION

The present invention has characteristics in terms of, besides the transparency, solvent resistance, and heat resistance mentioned above, enhanced performance of the liquid crystal alignment capability by light irradiation (photo-alignment properties). That is, the present invention relates to a thermoset film forming composition containing a compound having a photo-aligning group and a hydroxy group that is the component (A) and a silicon isocyanate compound that is the component (B). Here, the thermoset film having photo-alignment properties refers to a film cured by being heated in which optical anisotropy is induced by being irradiated with linear polarized light.

Details of the components will be described hereinafter.

<Component (A)>

The component (A) is a compound having a photo-aligning group and a hydroxy group.

In the present invention, the photo-aligning group refers to a functional group of a structure moiety to be photodimerized or photoisomerized.

The structure to be photodimerized refers to a functional group of a structure moiety forming a dimer by being irradiated with light and specific examples thereof include a cinnamoyl group, a calcone group, a coumarin group, and an anthracene group. Among them, preferred is a cinnamoyl group having high transparency in a visible light region and photodimerization reactivity. In addition, the structure moiety to be photoisomerized refers to a structure moiety converted into a cis form or a trans form by being irradiated with light and specific examples thereof include a moiety containing an azobenzene structure and a moiety containing a stilbene structure. Among them, in terms of high reactivity, the azobenzene structure is preferred. The compound having a photo-aligning group and a hydroxy group is a compound of formulae:

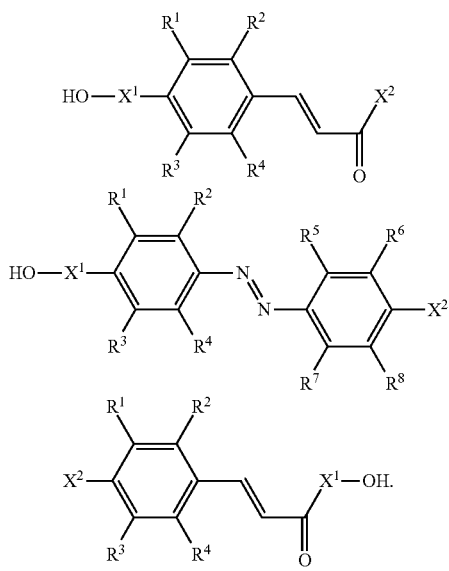

In the formulae, $X^1$ is a single bond or is $C_{1-18}$ alkylene, phenylene, biphenylene, or cyclohexylene bonded through a covalent bond, an ether bond, an ester bond, an amide bond, an amino bond, or a urea bond. At this time, alkylene, phenylene, and biphenylene are optionally substituted with one or more substituent(s) the same as or different from each other that is(are) selected from a halogen atom and a cyano group. In the formulae, $X^2$ is a hydrogen atom, a cyano group, a nitro group, a $C_{1-18}$ alkyl group, a phenyl group, or a biphenyl group. At this time, the $C_{1-18}$ alkyl group, the phenyl group, the biphenyl group, or the cyclohexyl group is optionally bonded through a covalent bond, an ether bond, an ester bond, an amide bond, an amino bond, or a urea bond and the phenyl group and the biphenyl group are optionally substituted with any one of a halogen atom and a cyano group.

$R^1$, $R^2$, $R^3$, $R^4$, $R^5$, $R^6$, $R^7$, and $R^8$ are independently a hydrogen atom, a $C_{1-4}$ alkyl group, a $C_{1-4}$ alkoxy group, a halogen atom, a trifluoromethyl group, or a cyano group.

Specific examples of the compound having a photo-aligning group and a hydroxy group include 4-(8-hydroxyoctyloxy)cinnamic acid methyl ester, 4-(6-hydroxyhexyloxy)cinnamic acid methyl ester, 4-(4-hydroxybutyloxy)cinnamic acid methyl ester, 4-(3-hydroxypropyloxy)cinnamic acid methyl ester, 4-(2-hydroxyethyloxy)cinnamic acid methyl ester, 4-hydroxymethyloxycinnamic acid methyl ester, 4-hydroxycinnamic acid methyl ester, 4-(8-hydroxyoctyloxy)cinnamic acid ethyl ester, 4-(6-hydroxyhexyloxy)cinnamic acid ethyl ester, 4-(4-hydroxybutyloxy)cinnamic acid ethyl ester, 4-(3-hydroxypropyloxy)cinnamic acid ethyl ester, 4-(2-hydroxyethyloxy)cinnamic acid ethyl ester, 4-hydroxymethyloxycinnamic acid ethyl ester, 4-hydroxycinnamic acid ethyl ester, 4-(8-hydroxyoctyloxy)cinnamic acid phenyl ester, 4-(6-hydroxyhexyloxy)cinnamic acid phenyl ester, 4-(4-hydroxybutyloxy)cinnamic acid phenyl ester, 4-(3-hydroxypropyloxy)cinnamic acid phenyl ester, 4-(2-hydroxyethyloxy)cinnamic acid phenyl ester, 4-hydroxymethyloxycinnamic acid phenyl ester, 4-hydroxycinnamic acid phenyl ester, 4-(8-hydroxyoctyloxy)cinnamic acid biphenyl ester, 4-(6-hydroxyhexyloxy)cinnamic acid biphenyl ester, 4-(4-hydroxybutyloxy)cinnamic acid biphenyl ester, 4-(3-hydroxypropyloxy)cinnamic acid biphenyl ester, 4-(2-hydroxyethyloxy)cinnamic acid biphenyl ester, 4-hydroxymethyloxycinnamic acid biphenyl ester, 4-hydroxycinnamic acid biphenyl ester, cinnamic acid 8-hydroxyoctyl ester, cinnamic acid 6-hydroxyhexyl ester, cinnamic acid 4-hydroxybutyl ester, cinnamic acid 3-hydroxypropyl ester, cinnamic acid 2-hydroxyethyl ester, cinnamic acid hydroxymethyl ester, 4-(8-hydroxyoctyloxy)azobenzene, 4-(6-hydroxyhexyloxy)azobenzene, 4-(4-hydroxybutyloxy)azobenzene, 4-(3-hydroxypropyloxy)azobenzene, 4-(2-hydroxyethyloxy)azobenzene, 4-hydroxymethyloxyazobenzene, 4-hydroxyazobenzene, 4-(8-hydroxyoctyloxy)calcone, 4-(6-hydroxyhexyloxy)calcone, 4-(4-hydroxybutyloxy)calcone, 4-(3-hydroxypropyloxy)calcone, 4-(2-hydroxyethyloxy)calcone, 4-hydroxymethyloxycalcone, 4-hydroxycalcone, 4'-(8-hydroxyoctyloxy)calcone, 4'-(6-hydroxyhexyloxy)calcone, 4'-(4-hydroxybutyloxy)calcone, 4'-(3-hydroxypropyloxy)calcone, 4'-(2-hydroxyethyloxy)calcone, 4'-hydroxymethyloxycaleone, 4'-hydroxycalcone, 7-(8-hydroxyoctyloxy)coumarin, 7-(6-hydroxyhexyloxy)coumarin, 7-(4-hydroxybutyloxy)coumarin, 7-(3-hydroxypropyloxy)coumarin, 7-(2-hydroxyethyloxy)cournarin, 7-hydroxymethyloxycoumarin, 7-hydroxycoumarin, 6-hydroxyoctyloxycoumarin, 6-hydroxyhexyloxycoumarin, 6-(4-hydroxybutyloxy)coumarin, 6-(3-hydroxypropyloxy)coumarin, 6-(2-hydroxyethyloxy)coumarin, 6-hydroxymethyloxycoumarin, and 6-hydroxycoumarin, to which the specific examples are not limited.

In the present invention, the compound as the component (A) may be a mixture of compounds having a plurality of types of photo-aligning groups and a hydroxy group.

<Component (B)>

The component (B) is a silicon isocyanate compound.

In the present invention, the silicon isocyanate compound is a compound of formula:

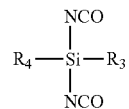

In the formula, $R^3$ and $R^4$ are independently a $C_{1-6}$ alkyl group, an isocyanate group, a $C_{1-6}$ alkoxy group, a phenyl group, or a vinyl group.

The silicon isocyanate compound as the component (B) has preferably, in terms of thermo-curability and adhesion with a base substrate, three or more isocyanate groups.

Specific examples of the silicon isocyanate compound as the component (B) include trimethylsilyl isocyanate, dimethylsilyl diisocyanate, methylsilyl triisocyanate, vinylsilyl triisocyanate, phenylsilyl triisocyanate, tetraisocyanate and ethoxysilane triisocyanate.

In the present invention, the silicon isocyanate compound as the component (B) may be a mixture of a plurality of types of silicon isocyanate compounds.

In the present invention, an isocyanate group of the silicon isocyanate compound as the component (B) may be blocked using a blocking agent. Specific examples of such a blocking agent include: oximes such as methyl ethyl ketone oxime, methyl isobutyl ketone oxime, cyclohexanone oxime, diisobutyl ketone oxime, acetone oxime, butanal oxime, and acetoaldehyde oxime; lactams such as ε-caprolactam and heptano lactam; phenols such as phenol and cresol; and pyrazoles such as pyrazole, 3,5-dimethylpyrazole, and 3-methylpyrazole.

<Solvent>

The composition for forming thermoset film having photo-alignment properties of the present invention is dissolved in a solvent to be mainly used in a solution state. The solvent used at this time is necessary to be a solvent capable of dissolving the component (A) and the component (B) and a solvent not reacted with the component (B).

Specific examples of the solvent include methylcellosolve acetate, ethylcellosolve acetate, propylene glycol monomethyl ether acetate, propylene glycol propyl ether acetate, toluene, xylene, methyl ethyl ketone, cyclopentanone, cyclohexanone, 2-butanone, 3-methyl-2-pentanone, 2-pentanone, 2-heptanone, γ-butyrolactone, ethyl ethoxyacetate, methyl 3-methoxypropionate, ethyl 3-methoxypropionate, ethyl 3-ethoxypropionate, methyl 3-ethoxypropionate, methyl pyruvate, ethyl pyruvate, ethyl acetate, butyl acetate, N,N-dimethylformamide, N,N-dimethylacetamide, and N-methylpyrrolidone.

These solvents may be used individually or in combination of two or more types thereof. Among these solvents, cyclohexanone, 2-heptanone, propylene glycol propyl ether acetate, methyl 3-methoxypropionate, ethyl 3-methoxypropionate, ethyl 3-ethoxypropionate, and methyl 3-ethoxypropionate are applicable in the production line of an overcoating of a color filter and have advantageous film-formation property and a high degree of safety, so that they are more preferred.

<Other Additives>

Furthermore, the composition for forming thermoset film having photo-alignment properties of the present invention may contain, so long as not impairing the effect of the present invention and if necessary, a sensitizer, a silane coupling agent, a surfactant, a rheology adjusting agent, a pigment, a dye, a preservation stabilizer, an antifoamer, an antioxidant, and the like.

<Composition for Forming Thermoset Film having Photo-alignment Properties>

The composition for forming thermoset film having photo-alignment properties of the present invention is a composition containing a compound having a photo-aligning group and a hydroxy group as the component (A) and a silicon isocyanate compound as the component (B), and capable of containing, if desired, one or more type(s) of other additives. Then, usually, the composition is used as a solution in which these components are dissolved in a solvent.

The blending ratio between the component (A) and the component (B) is preferably 5:95 to 50:50 in a mass ratio. When the content of the component (B) is excessive compared with this range of blending ratio, the liquid crystal alignment properties of the composition are lowered easily. When the content of the component (B) is lower than this range of blending ratio, the solvent resistance of the composition decreases and consequently, the alignment properties of the composition are lowered easily.

The blending ratio, the preparing method, and the like when the composition for forming thermoset film having photo-alignment properties of the present invention is used as a solution, are described in detail below.

Although the content of the solid content in the composition for forming thermoset film having photo-alignment properties of the present invention is not particularly limited so long as each component of the composition is homogeneously dissolved in a solvent, the content is 1 to 80% by mass, preferably 3 to 60% by mass, more preferably 5 to 40% by mass. Here, the solid content refers to a component remaining after subtracting the solvent from the whole component of the composition for forming thermoset film having photo-alignment properties.

Examples of the preparing method of the composition for forming thermoset film having photo-alignment properties of the present invention include: a method including mixing the component (A) with the component (B) in a predetermined mixing ratio to prepare a homogeneous solution; and a method including this preparing method and further adding, in an appropriate stage if necessary, other additives to be mixed in the resultant mixture. From the viewpoint of preservation stability, it is preferred that each of the component (A) and the component (B) be dissolved in a solvent beforehand to prepare each solution and each solution be mixed before the use to be used.

The prepared solution of the composition for forming thermoset film having photo-alignment properties is preferably filtered using a filter having a pore diameter of around 0.2 μm to be used.

<Coating Film, Cured Film, and Liquid Crystal Alignment Layer>

By a method including: applying the solution of the composition for forming thermoset film having photo-alignment properties, which is one embodiment of the present invention, onto a substrate (for example, a silicon/silicon dioxide coated substrate, a silicon nitride substrate, a substrate coated with a metal such as aluminum, molybdenum, and chromium, a glass substrate, a quartz substrate, and an ITO substrate), a film (for example, a resin film such as a triacetylcellulose film, a polyester film, and an acrylic film), or the like by rotation coating, flow coating, roll coating, slit coating, slit coating followed by rotation coating, inkjet coating, printing, or the like; and then, predrying (prebaking) the resultant coating on a hot plate or in an oven, a coating film can be formed. Then, by subjecting the coating film to a heating treatment (postbaking), a cured film is formed.

As the conditions for prebaking, a heating temperature and a heating time accordingly selected from the ranges of the temperatures 70° C. to 140° C. and the times 0.4 to 60 minutes are adopted. The heating temperature and the heating time are preferably 80° C. to 130° C. and 0.5 to 10 minutes, respectively.

As the postbaking, there is adopted, for example, a method in which the coating film is subjected to a heating treatment at a heating temperature selected from a range of the temperatures 130° C. to 250° C. for 1 to 30 minute(s) in the case of on a hot plate, for 5 to 90 minutes in the case of in an oven.

The film thickness of the cured film formed using the composition for forming thermoset film having photo-alignment properties of the present invention is, for example, 0.06 to 30 μm and can be accordingly selected by considering the level difference and the optical and electrical properties of the used substrate.

By curing the composition for forming thermoset film having photo-alignment properties of the present invention under the above-mentioned conditions, it is possible to satisfactorily cover the level difference of the substrate and to form a cured film having high transparency.

By irradiating the thus formed thermoset film having photo-alignment properties with polarized UV, it is possible to case the thermoset film to function as a liquid crystal material alignment layer, that is, a layer in which a compound having liquid crystallinity is aligned.

In the irradiating method of polarized UV, usually, ultraviolet light to visible light having a wavelength of 150 to 450 nm are used and the irradiation is performed by irradiating the thermoset film at room temperature or in a heated state with linear polarized light in a vertical direction or an oblique direction.

The liquid crystal alignment layer formed from the composition for forming thermoset film having photo-alignment properties of the present invention has solvent resistance and heat resistance, so that applying a retardation material onto the liquid crystal alignment layer and heating the resultant coating to a phase transition temperature of the liquid crystal convert the retardation material into a liquid crystal state, and by photo-curing this retardation material, it is possible to form a layer having optical anisotropy.

As the retardation material, for example, a liquid crystal monomer having a polymerizable group and a composition containing the same are used. Then, when the base substrate forming the liquid crystal alignment layer is a film, the film is useful as an optically anisotropic film. Some of such retardation materials have alignment properties such as horizontal alignment, cholesteric alignment, vertical alignment, and hybrid alignment and such retardation materials can be used properly according to the necessary retardation.

By laminating two substrates having the liquid crystal alignment layer formed as described above via a spacer so that the liquid crystal alignment layers face each other via a spacer and by injecting a liquid crystal in between the two substrates, it is possible to prepare a liquid crystal display element in which a liquid crystal is aligned.

Therefore, the composition for forming thermoset film having photo-alignment properties of the present invention can be suitably used in various optically anisotropic films and various liquid crystal display elements.

The composition for forming thermoset film having photo-alignment properties of the present invention is useful also as a material for forming a cured film such as a protective film and an insulation film in various displays such as a thin film transistor (TFT) liquid crystal display element and an organic EL element, and is particularly suitable also as a material for forming an overcoating material of a color filter, an interlayer insulation film of a TFT liquid crystal element, an insulation film of an organic EL element, and the like.

EXAMPLES

The present invention will be described further in detail hereinafter referring to Examples, which should not be construed as limiting the scope of the present invention.
[Abbreviations used in Examples]
The meanings of the abbreviations used in Examples below are as follows.
<Solution of Component A (Compound Having Photo-aligning Group and Hydroxy Group)>
CIN 1: 10% by weight cyclohexanone solution of 4-(6-hydroxyhexyloxy)cinnamic acid methyl ester
CIN 2: 10% by weight cyclohexanone solution of cinnamic acid 6-hydroxyhexyl ester
CIN 3: 10% cyclohexanone solution of 4-hydroxycinnamic acid methyl ester
AZB 1: 10% cyclohexanone solution of 4-(6-hydroxyhexyloxy)azobenzene
<Comparison Solution of Component A (Compound Having Photo-aligning Group)>
CIN 4: 10% by weight cyclohexanone solution of 4-(6-methacryloyloxyhexyloxy)cinnamic acid methyl ester
CIN 4B: 4-(6-methacryloyloxyhexyloxy)cinnamic acid methyl ester <Solution of Component B (Silicon Isocyanate Compound)>
SiNCO 1: 10% cyelohexanone solution of tetraisocyanate silane
SiNCO 2: 10% cyclohexanone solution of methylsilyl triisocyanate
<Other Monomers>
MMA: methyl methacrylate
<Polymerization Initiator>
AIBN: α, α'-azobisisobutyronitrile
<Solvent>
CHN: cyclohexanone
NMP: N-methylpyrrolidone The number average molecular weight and the weight average molecular weight of the acrylic copolymer obtained according to Synthetic Examples below were measured using a GPC apparatus (manufactured by JASCO Corporation; Shodex (registered trademark) column KF 803L and KF 804L) under the condition of performing elution by flowing an elution solvent tetrahydrofuran in the column (column temperature: 40° C.) at a flow rate of 1 mL/min. The number average molecular weight (hereinafter, called Mn) and the weight average molecular weight (hereinafter, called Mw) were expressed as a value in terms of polystyrene.

Synthetic Example 1

48.0 g of CIN 4B, 12.0 g of MMA, and 1.3 g of AIBN as a polymerization initiator were dissolved in 166.8 g of CHN and the resultant reaction solution was subjected to the reaction at 80° C. for 20 hours to obtain an acrylic copolymer solution (solid content concentration: 27% by mass) (P1). Mn and Mw of the obtained acrylic copolymer were 8,700 and 18,000, respectively.

Example 1 to Example 5 and Comparative Example 1 and Comparative Example 2

Each of the compositions of Example 1 to Example 5 and Comparative Example 1 and Comparative Example 2 was prepared according to the formulation shown in Table 1 and each composition was subjected to the evaluations of solvent resistance, alignment properties, and transmittance.

TABLE 1

|  | Solution of component (A) (g) | Solution of component (B) (g) | Solvent (g) |
|---|---|---|---|
| Example 1 | CIN 1 3.2 | SiNCO 1 9 | — |
| Example 2 | CIN 2 3.2 | SiNCO 1 9 | — |
| Example 3 | CIN 3 3.2 | SiNCO 1 9 | — |
| Example 4 | AZB 1 3.2 | SiNCO 1 9 | — |
| Example 5 | CIN 1 3.2 | SiNCO 2 9 | — |
| Comparative Example 1 | CIN 4 3.2 | SiNCO 1 9 | — |
| Comparative Example 2 | P 1 10 | — | CHN 16 |

[Evaluation of Solvent Resistance]
Each of the compositions of Example 1 to Example 5 and Comparative Example 1 and Comparative Example 2 was applied onto a silicon wafer using a spin coater and the resultant coating was prebaked on a hot plate at a temperature of 80° C. for 120 seconds to form a coating film having a film thickness of 0.3 μm. The film thickness was measured using F20 (manufactured by Filmetrics, Inc.). This coating film was postbaked on a hot plate at a temperature of 180° C. for 5 minutes to form a cured film having a film thickness of 0.25 μm.

This cured film was immersed in CHN or NMP for 60 seconds and was dried at a temperature of 100° C. for 60 seconds to measure the film thickness. A cured film that caused no change in the film thickness after the immersion in CHN or NMP was evaluated as "○" and a cured film in which a decrease of the film thickness after the immersion was observed was evaluated as "x".

[Evaluation of Alignment Sensitivity]

Each of the compositions of Example 1 to Example 5 and Comparative Example 1 and Comparative Example 2 was applied onto a silicon wafer using a spin coater and the resultant coating was prebaked on a hot plate at a temperature of 80° C. for 120 seconds to form a coating film having a film thickness of 0.3 μm. The film thickness was measured using F20 (manufactured by Filmetrics, Inc.). This coating film was postbaked on a hot plate at a temperature of 180° C. for 5 minutes to form a cured film having a film thickness of 0.25 μm.

This cured film was irradiated perpendicularly with linear polarized light of 300 to 400 nm. Onto the substrate, a retardation material solution containing a liquid crystal monomer was applied using a spin coater and the resultant coating was prebaked on a hot plate at 80° C. for 60 seconds to form a coating film having a film thickness of 0.25 μm. The substrate was exposed to light with 1,000 mJ/cm² in a nitrogen atmosphere. The prepared substrate was sandwiched between deflection plates and the exposure dosage of polarized UV at 313 nm required for exhibiting alignment properties was measured as an alignment sensitivity. A cured film causing no alignment by being irradiated with 1,000 mJ/cm² or more was evaluated as "not aligned".

[Evaluation of Light Transmittance (Transparency)]

Each of the compositions of Example 1 to Example 5 and Comparative Example 1 and Comparative Example 2 was applied onto a silicon wafer using a spin coater and the resultant coating was prebaked on a hot plate at a temperature of 80° C. for 120 seconds to form a coating film having a film thickness of 0.3 μm. The film thickness was measured using F20 (manufactured by Filmetrics, Inc.). This coating film was postbaked on a hot plate at a temperature of 180° C. for 5 minutes to form a cured film having a film thickness of 0.25 μm.

The transmittance of this cured film relative to light having a wavelength of 400 nm was measured using a ultraviolet visible light spectrophotometer (manufactured by Shimadzu Corporation; trade name: Shimadzu UV-2550).

[Result of Evaluation]

The results of the evaluations are shown in Table 2 below.

TABLE 2

| | Solvent resistance | | Alignment sensitivity | Transmittance |
|---|---|---|---|---|
| | CHN | NMP | (mJ/cm²) | (%) |
| Example 1 | ○ | ○ | 30 | 100 |
| Example 2 | ○ | ○ | 100 | 100 |
| Example 3 | ○ | ○ | 100 | 98 |
| Example 4 | ○ | ○ | 100 | 97 |
| Example 5 | ○ | ○ | 100 | 100 |
| Comparative Example 1 | X | X | Not aligned | 97 |
| Comparative Example 2 | X | X | 1,000 | 96 |

Examples 1 to 5 had high transparency and exhibited resistance against any solvent of CHN and NMP. Each of them exhibited alignment properties with a small exposure dosage.

Comparative Examples 1 and 2 failed to provide satisfactory solvent resistance and alignment sensitivity was lowered largely.

INDUSTRIAL APPLICABILITY

The composition for forming thermoset film having photo-alignment properties according to the present invention is extremely useful as a material for a liquid crystal alignment layer of an optically anisotropic film or a liquid crystal display element and is also suitable as a material for forming an overcoating and a liquid crystal alignment film of a color filter, a retardation film, and a patterned retardation film for a 3D liquid crystal display.

The invention claimed is:

1. A composition for forming a thermoset film having photo-alignment properties, comprising:
    a component (A) that is a compound having a photo-aligning group and a hydroxy group; and
    a component (B) that is a silicon isocyanate compound;
    wherein:
    the composition is curable by heating to form the thermoset film having photo-alignment properties; and
    the component (A) is a compound having a formula selected from the group consisting of:

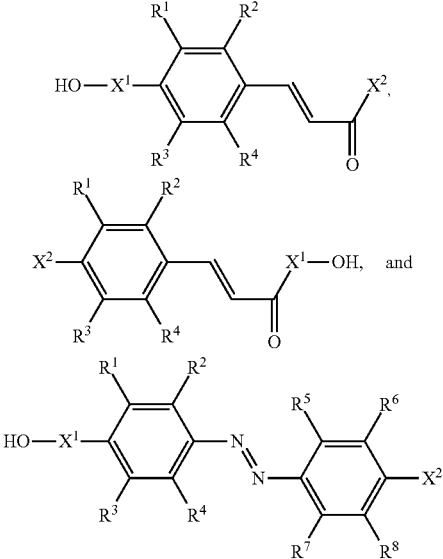

where:
    $X^1$ is a single bond or a $C_{1-18}$ alkylene group, a phenylene group, a biphenylene group, or a cyclohexylene group bonded through a covalent bond, an ether bond, an ester bond, an amide bond, an amino bond, or a urea bond;
    $X^2$ is a hydrogen atom, a cyano group, a nitro group, a $C_{1-18}$ alkyl group, a phenyl group, or a biphenyl group bonded through a covalent bond, an ether bond, an ester bond, an amide bond, an amino bond, or a urea bond; and
    each of $R^1$, $R^2$, $R^3$, $R^4$, $R^5$, $R^6$, $R^7$, and $R^8$ is independently a hydrogen atom, a $C_{1-4}$ alkyl group, a $C_{1-4}$ alkoxy group, a halogen atom, a trifluoromethyl group, or a cyano group.

2. The composition for forming the thermoset film having photo-alignment properties according to claim 1, wherein a blending ratio of a mass of the component (A) to a mass of the component (B) is in a range of from 5:95 to 50:50.

3. A liquid crystal alignment layer formed from the composition for forming the thermoset film having photo-alignment properties as claimed in claim 1.

4. An optical device comprising: a retardation layer obtained using the composition for forming the thermoset film having photo-alignment properties as claimed in claim 1.

* * * * *